US010796021B1

(12) United States Patent
Rajendrababu et al.

(10) Patent No.: US 10,796,021 B1
(45) Date of Patent: Oct. 6, 2020

(54) SYSTEMS AND METHODS FOR AUTOMATICALLY ADJUSTING PARENTAL CONTROLS OF COMPUTING DEVICES TO ACCOMMODATE HOLIDAYS

(71) Applicant: Symantec Corporation, Mountain View, CA (US)

(72) Inventors: Manjunath Rajendrababu, Tamil Nadu (IN); Trijimon Padmalayam Rajan, Tamil Nadu (IN)

(73) Assignee: NortonLifeLock Inc., Tempe, AZ (US)

( * ) Notice: Subject to any disclaimer, the term of this patent is extended or adjusted under 35 U.S.C. 154(b) by 0 days.

(21) Appl. No.: 16/427,868

(22) Filed: May 31, 2019

(51) Int. Cl.
*H04N 21/435* (2011.01)
*G06F 21/62* (2013.01)
*G06F 16/335* (2019.01)
*H04L 29/08* (2006.01)
*G06F 9/54* (2006.01)
*H04L 29/06* (2006.01)

(52) U.S. Cl.
CPC .............. *G06F 21/629* (2013.01); *G06F 9/54* (2013.01); *G06F 16/335* (2019.01); *H04L 63/20* (2013.01); *H04L 67/306* (2013.01)

(58) Field of Classification Search
CPC ........... H04N 21/4352; H04N 21/4524; H04N 21/25841; H04N 21/25883
See application file for complete search history.

(56) References Cited

U.S. PATENT DOCUMENTS

| 5,635,978 | A | * | 6/1997 | Alten | ..................... | H04N 5/445 348/569 |
| 5,809,369 | A | * | 9/1998 | Furuya | ............... | G03G 15/2003 399/70 |
| 5,822,542 | A | * | 10/1998 | Smith | .............. | G08B 13/19604 709/247 |
| 7,082,613 | B1 | * | 7/2006 | Mineyama | ......... | H04N 5/44543 348/E5.097 |
| 9,674,657 | B1 | | 6/2017 | Lin | | |

(Continued)

OTHER PUBLICATIONS

"familylink", URL: https://families.google.com/familylink/, retrieved on May 2, 2019, 10 pages.

(Continued)

*Primary Examiner* — Pankaj Kumar
*Assistant Examiner* — Timothy R Newlin
(74) *Attorney, Agent, or Firm* — FisherBroyles, LLP

(57) ABSTRACT

The disclosed computer-implemented method for automatically adjusting parental controls of computing devices to accommodate holidays may include (i) identifying, at a computing device, a geolocation of the computing device from geolocation information and (ii) performing, at the computing device, a security action. The security action may include (a) identifying holiday information associated with the geolocation of the computing device, (b) determining at least a portion of a current day is a holiday by comparing a current date to the holiday information, (c) determining a level of parental controls to impose on operation of the computing device in response to at least a portion of the current day being a holiday, and (d) imposing the level of parental controls on the computing device during the at least a portion of the current day. Various other methods, systems, and computer-readable media are also disclosed.

20 Claims, 6 Drawing Sheets

(56) References Cited

U.S. PATENT DOCUMENTS

| | | | | | |
|---|---|---|---|---|---|
| 2005/0005130 | A1* | 1/2005 | Okigami | ............ | H04N 1/00042 713/183 |
| 2006/0130100 | A1* | 6/2006 | Pentland | ............ | H04N 21/4524 725/68 |
| 2006/0218617 | A1* | 9/2006 | Bradstreet | ................ | H04N 5/76 725/135 |
| 2007/0204308 | A1* | 8/2007 | Nicholas | .............. | H04N 21/222 725/86 |
| 2008/0052026 | A1* | 2/2008 | Amidon | ............. | H04N 21/6547 702/104 |
| 2009/0051785 | A1* | 2/2009 | Kamada | ................. | H04N 5/232 348/231.5 |
| 2009/0083279 | A1* | 3/2009 | Hasek | .............. | H04N 21/23439 |
| 2009/0204993 | A1* | 8/2009 | White | ................... | H04N 7/163 725/46 |
| 2009/0292672 | A1* | 11/2009 | Kunjithapatham | ......................... | H04N 21/4668 |
| 2012/0124621 | A1* | 5/2012 | Wendling | ............... | H04N 7/165 725/34 |
| 2012/0159543 | A1* | 6/2012 | Jin | ................... | H04N 21/25841 725/39 |
| 2013/0227394 | A1* | 8/2013 | Sazhin | ................... | G06Q 30/02 715/234 |
| 2014/0253666 | A1* | 9/2014 | Ramachandran | ... | H04M 3/4872 348/14.06 |
| 2016/0026736 | A1* | 1/2016 | Natarajan | ......... | G06F 16/24578 707/694 |
| 2016/0044356 | A1* | 2/2016 | Eatedali | ........... | H04N 21/25891 725/34 |
| 2016/0359957 | A1* | 12/2016 | Laliberte | ................. | H04L 67/10 |
| 2018/0349386 | A1* | 12/2018 | Circlaeys | ........... | H04N 21/2353 |

OTHER PUBLICATIONS

"Kiddie Parental Control", URL: https://play.google.com/store/apps/details?id=net.frju.heimdall, retrieved on May 1, 2019, 3 pages.
"securekids", URL: https://securekids.es, retrieved on May 1, 2019, 8 pages.
"FamiSafe Kid", URL: https://www.familysafe.com/parental-control/, retrieved on May 1, 2019, 3 pages.
"GeoLocator Parental Control. Child Safety Location", URL: https://play.google.com/store/apps/details?id=app.geoloc&hl=en_US, retrieved on May 1, 2019, 3 pages.
"Bark", URL: https://www.bark.us/#how, retrieved on May 1, 2019, 13 pages.
"Family GPS tracker KidsControl", URL: https://play.google.com/store/apps/details?id=app.gpsme&hl=en, retrieved on May 1, 2019, 4 pages.
"Family Tracker", URL: https://play.google.com/store/apps/details?id=com.fibercode.familytracker, retrieved on May 1, 2019, 3 pages.
"FootPrints", URL: http://www.footprints.net/, retrieved on May 1, 2019, 3 pages.
"kiddoware", URL: https://kiddoware.com/, retrieved on May 1, 2019, 12 pages.
"Kids Zone", URL: https://play.google.com/store/apps/details?id=com.ootpapps.kids.zone.app.lock&hl=en_IN, retrieved on May 1, 2019, 3 pages.
"mSpy", URL: https://www.mspy.com/parental-control.html, retrieved on May 1, 2019, 5 pages.
"Onespy", URL: https://www.onespy.in/family-tracking.html, retrieved on May 1, 2019, 3 pages.
"Panspy", URL: https://www.panspy.com, retrieved on May 1, 2019, 4 pages.
"Parental Control—Safe Kids (KidzOye)", URL: https://play.google.com/store/apps/details?id=com.kidzoye.parentalcontrol, retrieved on May 1, 2019, 3 pages.
"SecuraFone", URL: http://www.securafone.com/home/, retrieved on May 1, 2019, 1 page.
"SecureTeen", URL: https://www.secureteen.com/, retrieved on May 1, 2019, 6 pages.
"Sentry", URL: https://www.sntry.io/, retrieved on May 1, 2019, 4 pages.
"Spy Human", URL: http://spyhuman.com/pages/parantal-control.html, retrieved on May 1, 2019, 5 pages.
"webwatcher", URL: https://www.webwatcher.com, retrieved on May 1, 2019, 15 pages.
"Zoemob", URL: https://www.zoemob.com/, retrieved on May 1, 2019, 8 pages.
"Bitdefender Parental Control", URL: https://www.bitdefender.com/, retrieved on May 1, 2019, 5 pages.
"Bit Guardian", URL: https://parentalcontrol.bit-guardian.com/, retrieved on May 1, 2019, 5 pages.
"Boomerang", URL: https://useboomerang.com/#screentime, retrieved on May 1, 2019, 27 pages.
"Easy Parental Control", URL: http://khad.landak.com/android/, retrieved on May 1, 2019, 1 page.
"FamilyOrbit", URL: https://www.familyorbit.com/features.php#home-features, retrieved on May 1, 2019, 11 pages.
"FamilyTime Parental Controls & Screen Time App", URL: https://familytime.io/, retrieved on May 1, 2019, 13 pages.
"Kaspersky", URL: https://www.kaspersky.co.in/safe-kids, retrieved on May 1, 2019, 9 pages.
"Kidgy", URL: https://kidgy.com/kidgy-for-android, retrieved on May 1, 2019, 6 pages.
"Kidslox", URL: https://kidslox.com/, retrieved on May 1, 2019, 5 pages.
"meerkiddo", URL: https://meerkiddo.com/, retrieved on May 1, 2019, 1 page.
"mmguardian", URL: https://www.mmguardian.com, retrieved on May 1, 2019, 5 pages.
"mobicip", URL: https://www.mobicip.com/, retrieved on May 1, 2019, 7 pages.
"netsparkmobile", URL: https://www.netsparkmobile.com/, retrieved on May 1, 2019, 4 pages.
"Our Pact", URL: https://ourpact.com/family-locator-kid-tracker/, retrieved on May 1, 2019, 4 pages.
"parental-control", URL: https://parental-control.net/, retrieved on May 1, 2019, 5 pages.
"Qustodio", URL: https://www.qustodio.com, retrieved on May 1, 2019, 8 pages.
"Safe Family", URL: http://family.mcafee.com, retrieved on May 1, 2019, 7 pages.
"Safe Lagoon Parental Control", URL: https://safelagoon.com/en/gps-tracker.html, retrieved on May 1, 2019, 4 pages.
"safekiddo", URL: https://play.google.com/store/apps/details?id=com.safekiddo.kid, retrieved on May 1, 2019, 3 pages.
"Screen Time", URL: https://screentimelabs.com/, retrieved on May 1, 2019, 12 pages.
"Screen Time Limit KidCrono", URL: https://itunes.apple.com/us/app/screen-time-limit-kidcrono/id966519383?mt=8, retrieved on May 1, 2019, 3 pages.
"screenGuide", URL: http://screen.guide/features, retrieved on May 1, 2019, 13 pages.
"Spyzie", URL: https://www.spyzie.com, retrieved on May 1, 2019, 6 pages.
"TeenLimit", URL: https://www.teenlimit.com/, retrieved on May 1, 2019, 5 pages.
"zenScreen", URL: http://www.zenscreen.ai/, retrieved on May 1, 2019, 5 pages.
"Pumpic", URL: https://pumpic.com/child-location-tracking.html, retrieved on May 1, 2019, 8 pages.
"Net Nanny", URL: https://www.netnanny.com/features/parental-controls/, retrieved on May 7, 2019, 7 pages.
"ESET", URL: https://www.eset.com/, retrieved on May 7, 2019, 1 page.
"ProgrammableWeb", URL: https://www.programmableweb.com/category/holidays/api, retrieved on May 7, 2019, 5 pages.

* cited by examiner

SYSTEMS AND METHODS FOR AUTOMATICALLY ADJUSTING PARENTAL CONTROLS OF COMPUTING DEVICES TO ACCOMMODATE HOLIDAYS

BACKGROUND

Parental control systems on computing devices may require different levels of parental controls for weekends as opposed to weekdays. On holidays, children may be allowed to use computing devices without many restrictions as may be permitted on weekends. However, some holidays occur on days that otherwise would be weekdays and/or schooldays, which means restrictions conventionally applied on weekdays and/or school days may incorrectly be applied on holidays. The present disclosure, therefore, identifies and addresses a need for systems and methods for automatically adjusting parental controls of computing devices to accommodate holidays.

SUMMARY

As will be described in greater detail below, the present disclosure describes various systems and methods for automatically adjusting parental controls of computing devices to accommodate holidays.

In one example, a method for automatically adjusting parental controls of computing devices to accommodate holidays may include (i) identifying, at a first computing device, a geolocation of the first computing device from geolocation information and (ii) performing, at the first computing device, a security action. The security action may include (a) identifying holiday information associated with the geolocation of the first computing device, (b) determining at least a portion of a current day is a holiday by comparing a current date to the holiday information, (c) determining a level of parental controls to impose on operation of the first computing device in response to at least a portion of the current day being a holiday, where the level of parental controls to impose on the first computing device is different than a level of parental controls imposed on non-holidays, and (d) imposing the level of parental controls to impose on the first computing device during the at least a portion of the current day.

In an example, the method may further include associating information identifying the holiday with information identifying the level of parental controls to impose on the holiday. In some examples, the method may further include storing, in a user profile, the information identifying the holiday with the information identifying the level of parental controls to impose on the holiday.

In an embodiment, the geolocation information may include at least one of (i) global positioning information, (ii) a regional code, (iii) a state code, (iv) a country code, and (v) a postal code.

In an example, the security action may include calling an API to request the holiday information and receiving the holiday information in response to requesting the API.

In some examples, the security action may include (i) querying a website for the holiday information, (ii) receiving hypertext markup language (HTML) information from the website in response to the query, and (iii) extracting the holiday information from the received HTML information. In an embodiment, the website may be a school website.

In an example, the at least a portion of the current day may be at least one of a school holiday, a national holiday, and a regional holiday.

In some examples, the level of parental controls to impose may enable a level of at least one of (i) access to the first computing device for a predetermined duration, (ii) access to a program the first computing device is configured to execute, and (iii) internet access by the first computing device. In some examples, the level of parental controls to impose may disable a level of at least one of (i) access to the first computing device for a predetermined duration, (ii) access to a program the first computing device is configured to execute, and (iii) internet access by the first computing device.

In some examples, the security action may include displaying, on a user display device of the first computing device, a message indicating the imposing of the level of parental controls on the first computing device. In an embodiment, the security action may include sending, to a second computing device, a message indicating the imposing of the level of parental controls on the first computing device during at least a portion of the current day.

In an example, the security action may include changing, following an end of the holiday, the level of parental controls to the level of parental controls imposed on non-holidays.

In one embodiment, a system for automatically adjusting parental controls of computing devices to accommodate holidays may include at least one physical processor of a computing device and physical memory that includes computer-executable instructions that, when executed by the physical processor, cause the physical processor to (i) identify, at the computing device, a geolocation of the computing device from geolocation information and (ii) perform, at the computing device, a security action. The security action may include (a) identifying holiday information associated with the geolocation of the computing device, (b) determining at least a portion of a current day is a holiday by comparing a current date to the holiday information, (c) determining a level of parental controls to impose on operation of the computing device in response to at least a portion of the current day being a holiday, where the level of parental controls to impose on the computing device is different than a level of parental controls imposed on non-holidays, and (d) imposing the level of parental controls to impose on the computing device during the at least a portion of the current day.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify, at the computing device, a geolocation of the computing device from geolocation information and (ii) perform, at the computing device, a security action. The security action may include (a) identifying holiday information associated with the geolocation of the computing device, (b) determining at least a portion of a current day is a holiday by comparing a current date to the holiday information, (c) determining a level of parental controls to impose on operation of the computing device in response to at least a portion of the current day being a holiday, where the level of parental controls to impose on the computing device is different than a level of parental controls imposed on non-holidays, and (d) imposing the level of parental controls on the computing device during the at least a portion of the current day.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
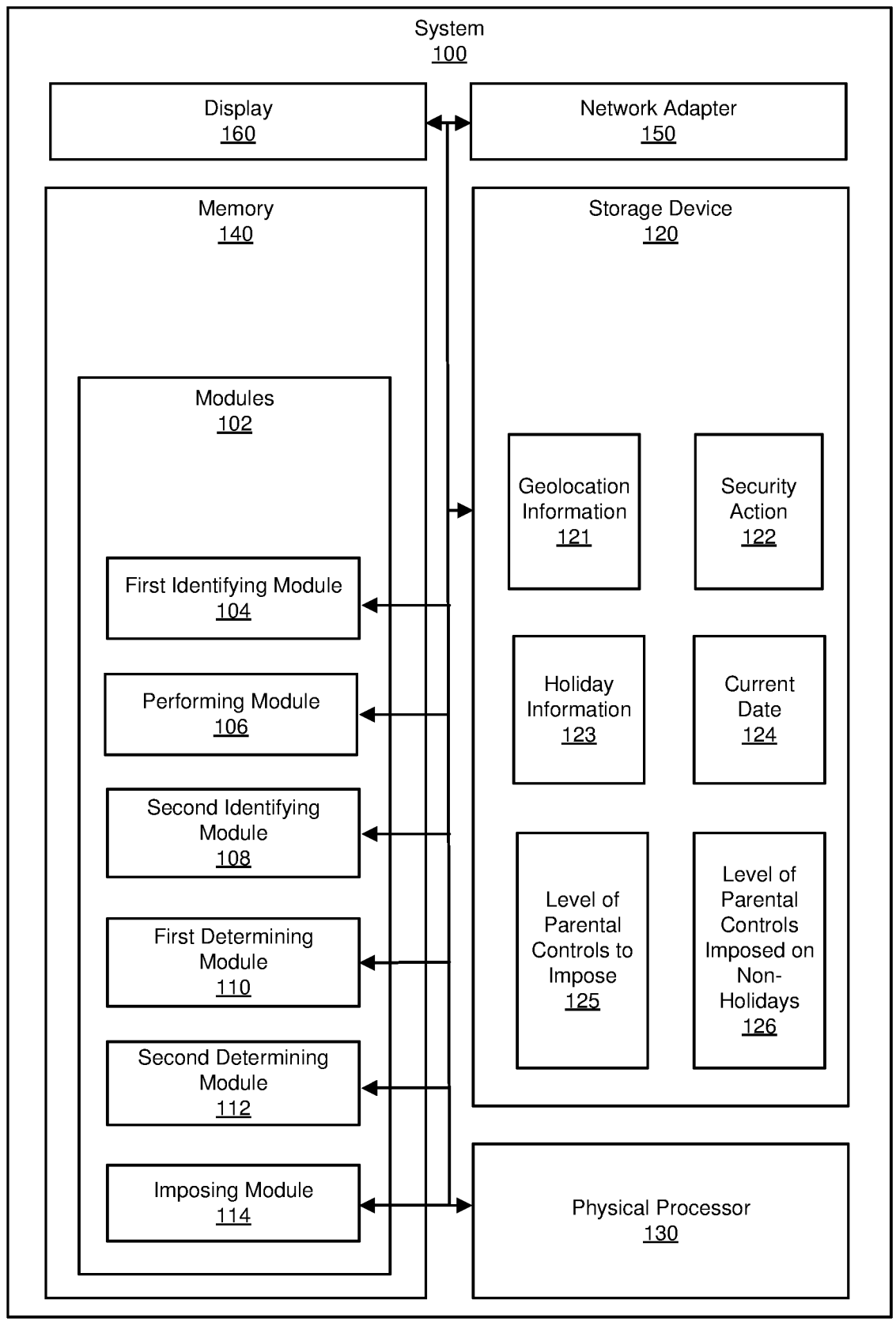
FIG. 1 is a block diagram of an example system for automatically adjusting parental controls of computing devices to accommodate holidays.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for automatically adjusting parental controls of computing devices to accommodate holidays. In some examples, the provided techniques may provide parental control applications that automatically and dynamically change parental control profiles applied to computing devices based on geolocation of the computing devices and in response to local events. Some non-limiting examples of computing devices in which the provide techniques may be implemented include smartphones, tablet computers, desktop computers, notebook computers, laptop computers, smartwatches, the like, or combinations thereof.

In some examples, the provided systems and methods may use application programming interfaces (APIs) and/or geolocation to discover local holidays and/or other relevant local events. In some examples, the provided systems and methods integrate parental control software with APIs to gather geolocations of computing devices and, based on the geolocation information, look-up holiday information.

In some examples, by using geolocation information obtained by computing devices, holiday information can be obtained for regions in which the computing devices are located by querying APIs, such as publicly-available APIs. The APIs may provide information based on country, state, cities or even schools. For example, when using an events API, public and school holidays of a location can be retrieved by parsing event categories such as "school-holidays" or "public-holidays" respectively, along with coordinates, postal codes, country codes, and/or state codes. Furthermore, in some examples, holiday information of schools may be extracted by scraping websites of schools for calendars of the schools.

In some examples, the provided systems and methods may then automatically dynamically change profiles applied by parental control applications based on the holiday information (e.g., automatically dynamically change applied profiles when current days are public holidays). In some examples, using the information gathered using the techniques described herein, days of the week (e.g., a current day) can be identified as school days or holidays, and computing devices may respond by automatically switching profiles applied to the computing devices.

In some examples, once profiles are switched, the parental control application may send notifications to respective parents informing the parents about profile changes, through applications, emails, and/or text messages.

By doing so, the systems and methods described herein may advantageously improve the security of computing devices and/or provide targeted protection against malware, malicious use, and/or improper use. As such, the provided techniques may protect users by beneficially reducing security risks posed by malicious processes, malicious users, and/or malicious use. In some embodiments, the provided techniques may advantageously automatically adjust, to accommodate holidays, levels of parental controls imposed on computing devices. In some embodiments, the provided systems and methods may advantageously improve usability of parental control applications.

Figure 2:
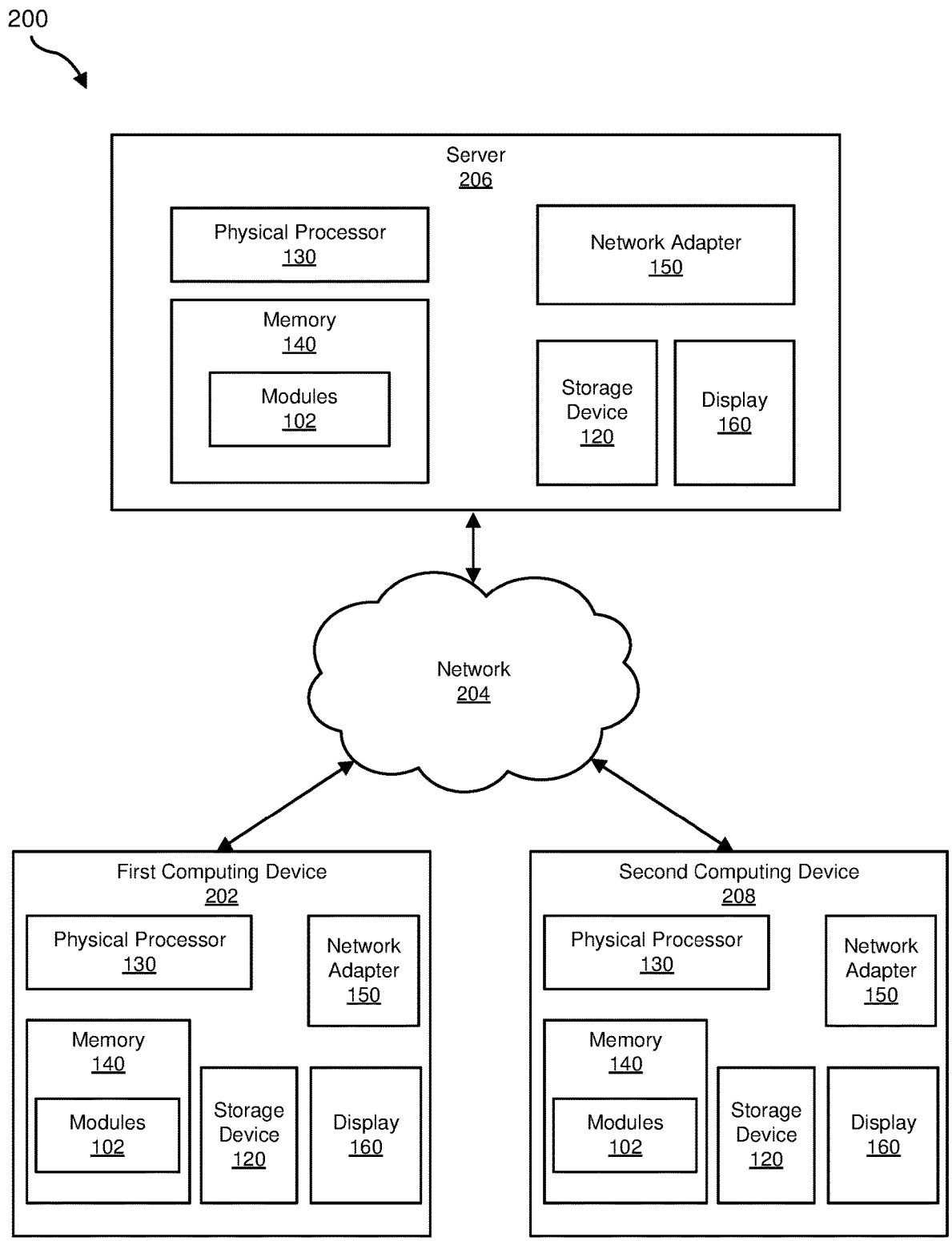
FIG. 2 is a block diagram of an additional example system for automatically adjusting parental controls of computing devices to accommodate holidays.
Figure 3:
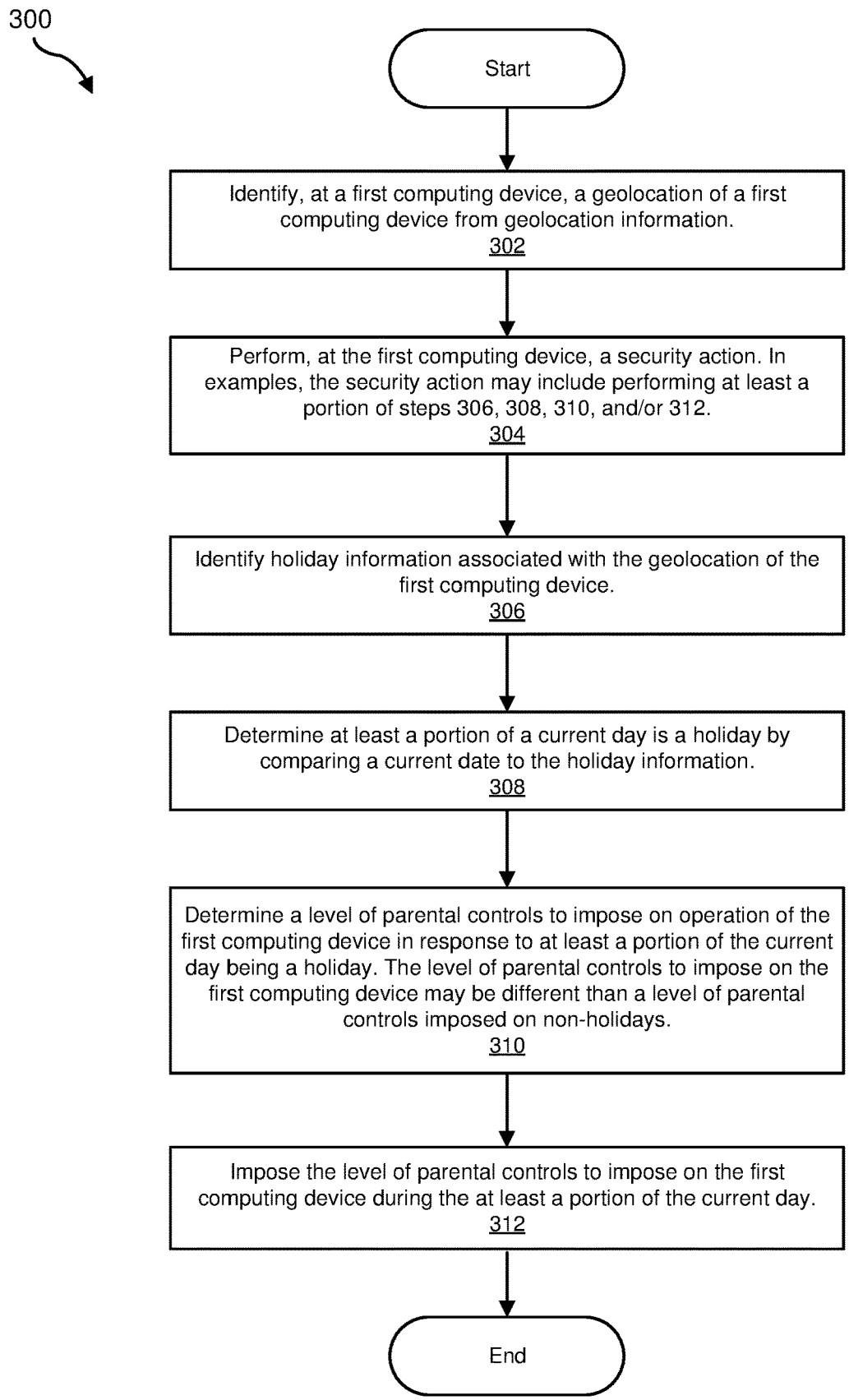
FIG. 3 is a flow diagram of an example method for automatically adjusting parental controls of computing devices to accommodate holidays.
Figure 4:
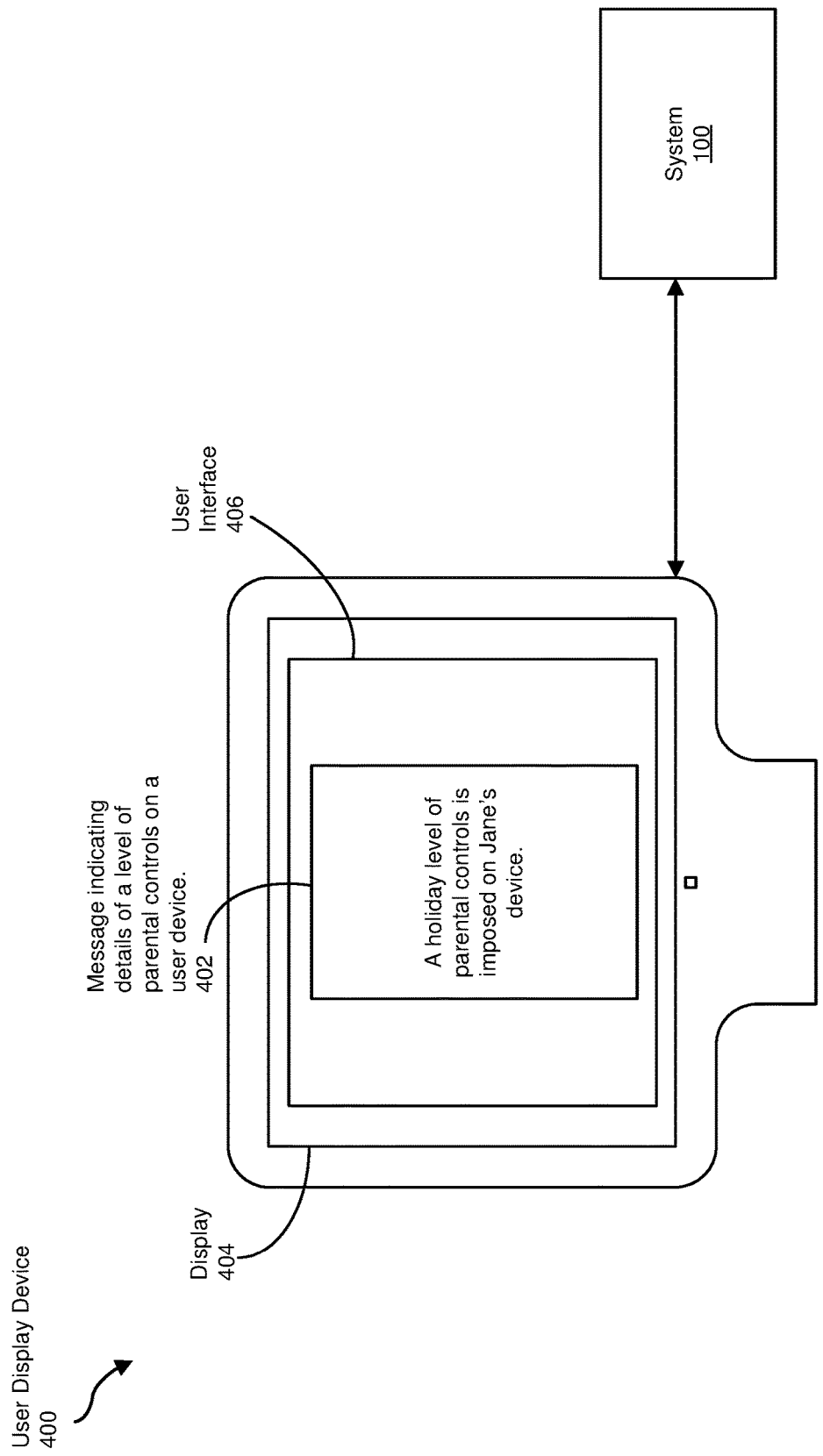
FIG. 4 depicts a non-limiting example of a user display device depicting a warning message.

The following will provide, with reference to FIGS. 1-2 and 4, detailed descriptions of example systems for automatically adjusting parental controls of computing devices to accommodate holidays. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 5 and 6, respectively.

FIG. 1 is a block diagram of an example system 100 for automatically adjusting parental controls of computing devices to accommodate holidays. As illustrated in this figure, example system 100 may include one or more modules 102 for performing one or more tasks. As will be explained in greater detail below, modules 102 may include a first identifying module 104, a performing module 106, a second identifying module 108, a first determining module 110, a second determining module 112, and/or an imposing module 114. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., a first computing device 202, a server 206, and/or a second computing device 208). One or more of modules 102 in FIG. 1 may also represent all or portions of one or more special-purpose computers configured to perform one or more tasks.

As illustrated in FIG. 1, example system 100 may also include one or more tangible storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of geolocation information 121, a security action 122, holiday information 123, a current date 124, a level of parental controls to impose 125, and/or a level of parental controls imposed on non-holidays 126. In some examples, storage device 120 may generally represent multiple storage devices. Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate automatically adjusting parental controls of computing devices to accommodate holidays. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more network adapters, such as network adapter 150. In some examples, network adapter 150 may be a physical network adapter connected to a physical network (e.g., network 204 in FIG. 2).

As illustrated in FIG. 1, example system 100 may also include one or more display devices, such as display 160. Display 160 generally represents any type or form of device capable of visually displaying information (e.g., to a user). In some examples, display 160 may present a graphical user interface. In non-limiting examples, display 160 may present at least a portion of information indicating one or more of geolocation information 121, security action 122, holiday information 123, current date 124, level of parental controls to impose 125, and/or level of parental controls imposed on non-holidays 126.

Example system 100 in FIG. 1 may be implemented in a variety of ways. For example, all or a portion of example system 100 may represent portions of example system 200 in FIG. 2. As shown in FIG. 2, system 200 may include first computing device 202 in communication with server 206 via a network 204. In one example, all or a portion of the functionality of modules 102 may be performed by first computing device 202, server 206, second computing device 208, and/or any other suitable computing system. As will be described in greater detail below, one or more of modules 102 from FIG. 1 may, when executed by at least one processor of first computing device 202, server 206, and/or second computing device 208, enable first computing device 202, server 206, and/or second computing device 208 to automatically adjust parental controls of computing devices to accommodate holidays. For example, and as will be described in greater detail below, one or more of modules 102 may cause first computing device 202, server 206, and/or second computing device 208 to (i) identify a geolocation of first computing device 202 and/or second computing device 208 from geolocation information and (ii) perform, at first computing device 202 and/or second computing device 208, a security action. The security action may include (a) identifying holiday information associated with the geolocation of first computing device 202 and/or second computing device 208, (b) determining at least a portion of a current day is a holiday by comparing a current date to the holiday information, (c) determining a level of parental controls to impose on operation of first computing device 202 and/or second computing device 208 in response to at least a portion of the current day being a holiday, where the level of parental controls to impose on first computing device 202 and/or second computing device 208 is different than a level of parental controls imposed on non-holidays, and (d) imposing the level of parental controls on first computing device 202 and/or second computing device 208 during the at least a portion of the current day.

First computing device 202 generally represents any type or form of computing device capable of reading computer-executable instructions. In some examples, first computing device 202 may represent a computer running security software, such as parental control software. Additional examples of first computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between first computing device 202, server 206, and/or second computing device 208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device capable of reading computer-executable instructions. In some examples, server 206 may represent a computer running security software, such as parental control software. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Second computing device 208 generally represents any type or form of computing device capable of reading computer-executable instructions. In some examples, second computing device 208 may represent a computer running security software, such as parental control software. Additional examples of second computing device 208 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, Internet-of-Things devices (e.g., smart appliances, etc.), variations or combinations of one or more of the same, and/or any other suitable computing device.

FIG. 3 is a flow diagram of an example computer-implemented method 300 for automatically adjusting parental controls of computing devices to accommodate holidays. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify geolocations of first computing devices from geolocation information. The systems described herein may perform step 302 in a variety of ways. For example, first identifying module 104 may, as part of first computing device 202, server 206, and/or second computing device 208 in FIG. 2, identify (e.g., at first computing device 202), a geolocation of first computing device 202 from geolocation information 121.

In some embodiments, geolocation information may include at least one of (i) global positioning information, (ii) a regional code, (iii) a state code, (iv) a country code, and/or (v) a postal code.

As illustrated in FIG. 3, at step 304 one or more of the systems described herein may automatically perform security actions. In examples, the security actions may include performing at least a portion of steps 306, 308, 310, and/or 312. The systems described herein may perform step 304 in a variety of ways. For example, performing module 106 may, as part of first computing device 202, server 206, and/or second computing device 208 in FIG. 2, perform (e.g., at first computing device 202), security action 122.

As illustrated in FIG. 3, at step 306 one or more of the systems described herein may automatically identify holiday information associated with geolocations of the first computing devices. The systems described herein may perform step 306 in a variety of ways. For example, second identifying module 108 may, as part of first computing device 202, server 206, and/or second computing device 208 in FIG. 2, identify holiday information 123 associated with the geolocation of first computing device 202.

In some embodiments, security actions may include calling application programming interfaces (APIs) to request the holiday information and receiving the holiday information in response to requesting the APIs.

In some examples, security actions may include (i) querying websites for the holiday information, (ii) receiving hypertext markup language (HTML) information from the websites in response to the queries, and/or (iii) extracting the holiday information from the received HTML information. In an embodiment, the websites may be websites used by schools to communicate information such as a school calendar including holiday information. In an example, the at least a portion of the current days may be at least at least a portion of a school holiday, a national holiday, and/or a regional holiday.

The term "holiday information," as used herein, generally may refer to information indicating a period of time that is a holiday. In some examples, holiday information may indicate at least a portion of a specific day, week, and/or month that is a holiday. In some examples, holiday information may indicate at least one calendar date on which the holiday occurs. In some examples, holiday information may indicate a name of the respective holiday. An example of holiday information includes, without limitation, January first as "New Year's Day" holiday. Another example of holiday information includes, without limitation, December thirty-first as "New Year's Eve" holiday.

As illustrated in FIG. 3, at step 308 one or more of the systems described herein may automatically determine at least a portion of current days are holidays by comparing current dates to the holiday information. The systems described herein may perform step 308 in a variety of ways. For example, first determining module 110 may, as part of first computing device 202, server 206, and/or second computing device 208 in FIG. 2, determine at least a portion of a current day is a holiday by comparing current date 124 to holiday information 123.

As illustrated in FIG. 3, at step 310 one or more of the systems described herein may automatically determine levels of parental controls to impose on operation of the first computing devices in response to at least portions of the current days being holidays. In some examples, the levels of parental controls to impose on the first computing devices may be different than levels of parental controls imposed on non-holidays. The systems described herein may perform step 310 in a variety of ways. For example, second determining module 112 may, as part of first computing device 202, server 206, and/or second computing device 208 in FIG. 2, determining level of parental controls to impose 125 on operation of first computing device 202 in response to at least a portion of the current day being a holiday, where the level of parental controls to impose on the first computing device 125 is different than level of parental controls imposed on non-holidays 126.

In some examples, levels of parental controls to impose may enable levels of at least one of (i) access to the first computing devices for predetermined durations, (ii) access to programs the first computing devices are configured to execute, and/or (iii) internet access by the first computing devices. In some examples, the levels of parental controls to impose may disable levels of at least one of (i) access to the first computing devices for predetermined durations, (ii) access to programs the first computing devices are configured to execute, and/or (iii) internet access by the first computing devices.

In some embodiments, the provided systems and methods may use user profiles to increase efficiency and repeatability of the methods. In some embodiments, user profiles may be recorded in advance of implementation (e.g., during a set-up phase of the parental controls and/or a mid-use adjustment phase of the parental controls). In some examples, the method may further include associating information identifying the holidays with information identifying the levels of parental controls to impose on the holidays. In some examples, the method may further include storing, in user profiles, the information identifying the holidays with the information identifying the levels of parental controls to impose on the holidays. Thus, using user profiles can facilitate automatically applying event-driven policies.

As illustrated in FIG. 3, at step 312 one or more of the systems described herein may automatically impose the levels of parental controls on the first computing devices during the at least portions of the current days. The systems described herein may perform step 312 in a variety of ways. For example, imposing module 114 may, as part of first computing device 202, server 206, and/or second computing device 208 in FIG. 2, impose level of parental controls to impose 125 on first computing device 202 during the at least a portion of the current day.

In some examples, the security actions may include displaying, on user display devices (e.g., display 160) of the first computing devices, messages indicating the imposing of the levels of parental controls on the first computing devices. In an embodiment, the security actions may include sending, to second computing devices (e.g., second computing device 208), messages indicating the imposing of the levels of parental controls on the first computing devices during at least portions of the current days.

FIG. 4 depicts a non-limiting example of a user display device 400 including display 404 (e.g., display 160) which may present user interface 406. In this non-limiting example, user display device 400 may display warning message 402 as at least a part of security action 122.

In some examples, parents and/or children may be informed of changes to levels of parental controls applied to the children's computing devices. Thus, in some examples, warning message 402 may be sent from first computing device 202 to second computing device 208 and displayed on second computing device 208 indicating the imposing of a level of parental controls to impose 125 (e.g., a holiday level of parental controls) on first computing device 202. In an example, warning message 402 may be displayed on first computing device 202 to indicate the imposing of a holiday level of parental controls on first computing device 202.

In some examples, warning messages may include details about applied parental controls. In an example, me warning message 402 may identify the computing device on which the level of parental controls has been changed. In some embodiments, warning message 402 may identify details describing the level of parental controls that has been applied. In some embodiments, warning message 402 may describe a time and/or date at which the level of parental controls that has been applied will change to a different level of parental controls. In some embodiments, warning message 402 may identify a level of parental controls associated with a user profile applied to first computing device 202 during and/or after a holiday. In some embodiments, user display device 400 may display a status message (e.g., in response to a user request for parental control status) indicating a level of parental controls applied to first computing device 202 (e.g., during and/or after a holiday).

We now return to FIG. 3.

In some embodiments, following the holidays, the method may automatically revert the levels of parental controls to prior levels. In an example, the security actions may include changing, following ends of the holidays, the levels of parental controls imposed on holidays to the levels of parental controls imposed on non-holidays.

The present disclosure is generally directed to systems and methods for automatically adjusting parental controls of computing devices to accommodate holidays. In some examples, the provided techniques may provide parental control applications that automatically and dynamically change parental control profiles applied to computing devices based on geolocation of the computing devices and in response to local events. Some non-limiting examples of computing devices in which the provide techniques may be implemented include smartphones, tablet computers, desktop computers, notebook computers, laptop computers, smartwatches, the like, or combinations thereof.

In some examples, the provided systems and methods may use application programming interfaces (APIs) and/or geolocation to discover local holidays and/or other relevant local events. In some examples, the provided systems and methods integrate parental control software with APIs to gather geolocations of computing devices and, based on the geolocation information, look-up holiday information.

As detailed above, the steps outlined in method 300 in FIG. 3 may automatically change parental control profiles applied to computing devices based on geolocation of the computing devices and/or in response to local events. By doing so, the systems and methods described herein may protect users by beneficially providing protection against malware, malicious use, and/or improper use. As such, the provided techniques may protect users by beneficially reducing security risks posed by malicious processes, malicious users, and/or malicious use.

Figure 5:
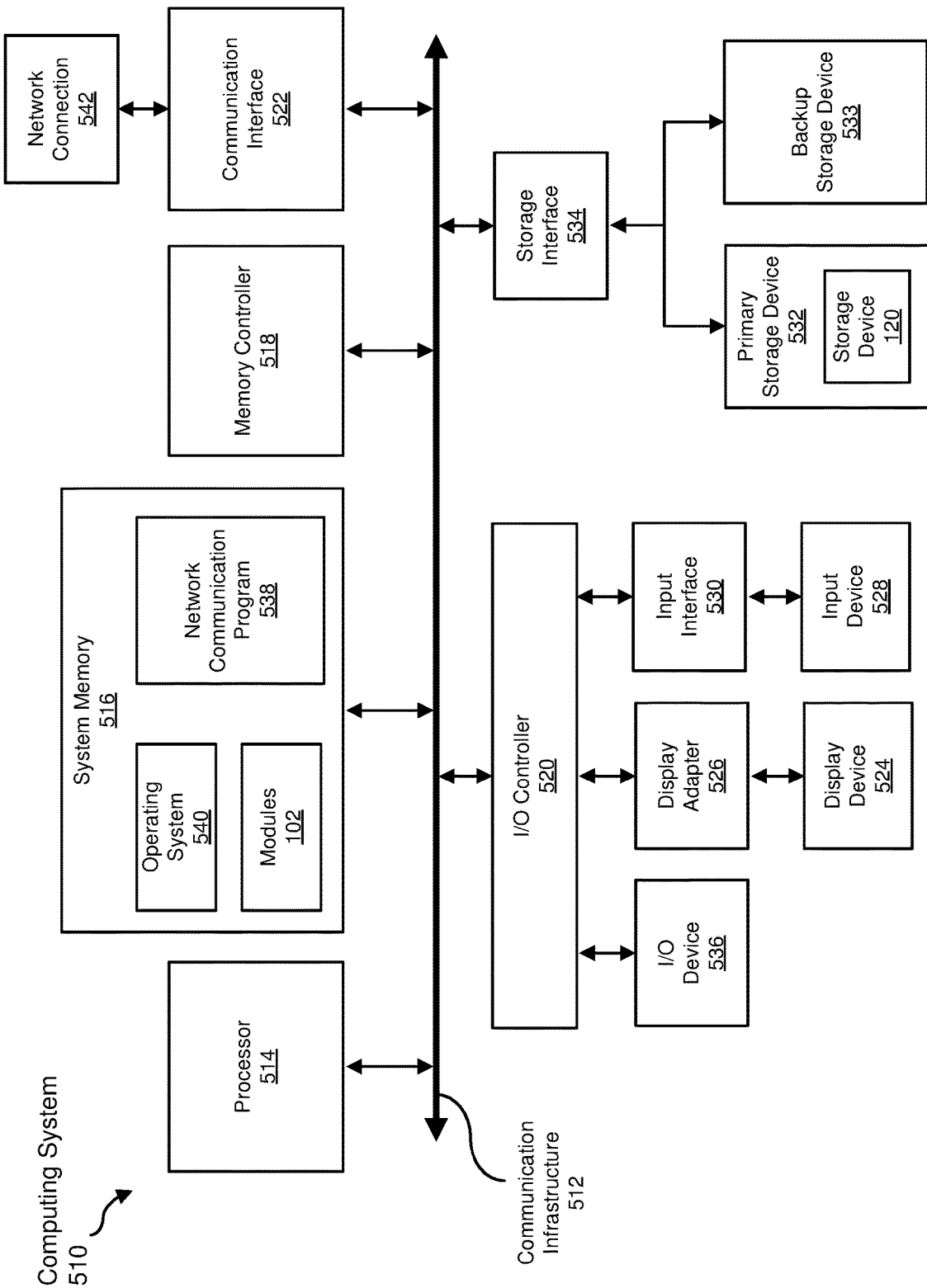
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, storage device 120 may be at least a part of primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
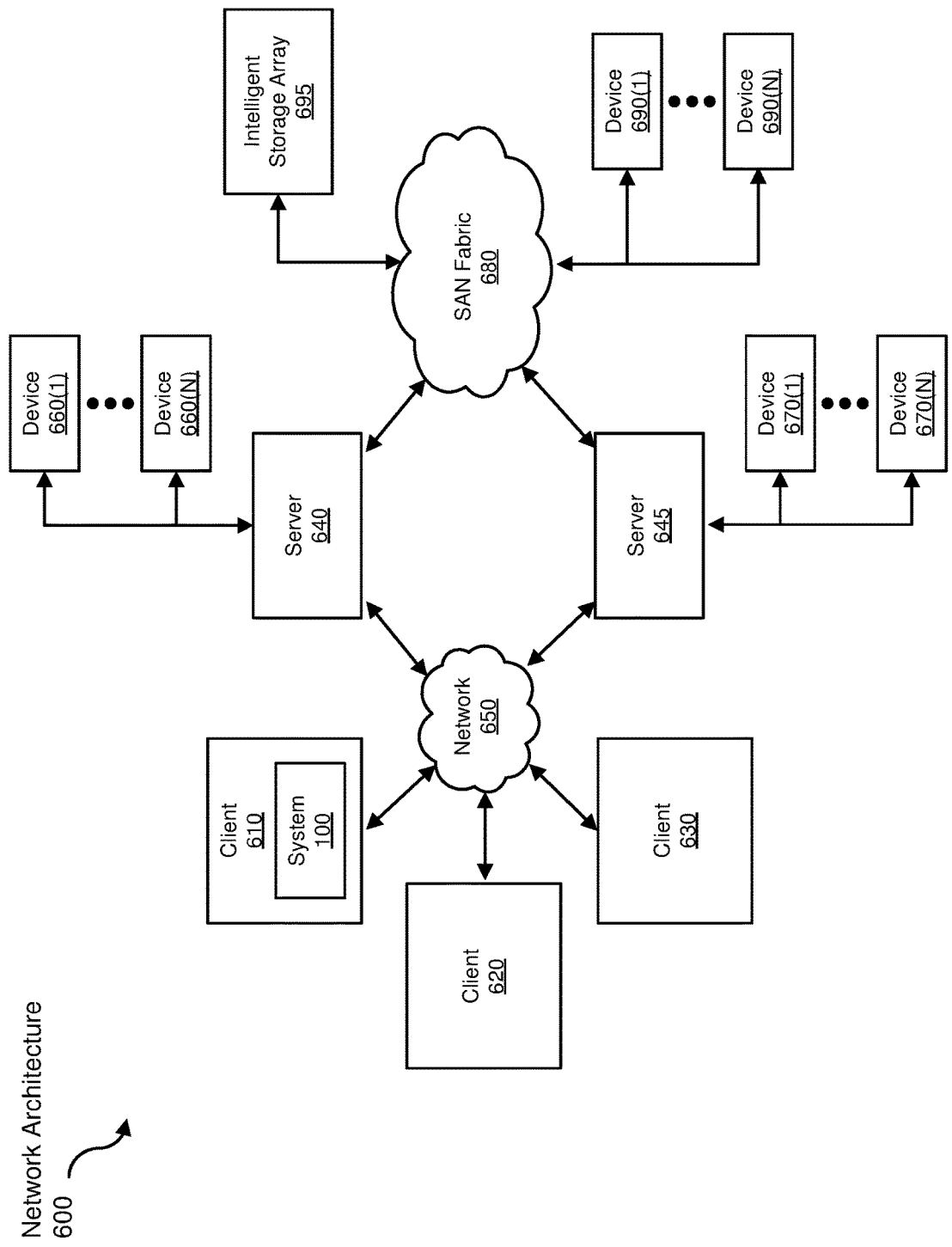
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the present disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for automatically adjusting parental controls of computing devices to accommodate holidays.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive data to be transformed, transform the data, output results of the transformation to display devices, use the results of the transformations to adjust levels of parental controls applied to computing devices, and store the results of the transformations to storage devices. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." The singular may portend the plural, where practicable. Finally, for ease of use, the terms "including" and "having" (and their derivatives), as used in the specification and claims, are interchangeable with and have the same meaning as the word "comprising."

What is claimed is:

1. A computer-implemented method for automatically adjusting parental controls of computing devices to accommodate holidays, at least a portion of the method being performed by a first computing device comprising at least one processor, the method comprising:
    identifying, at the first computing device, a geolocation of the first computing device from geolocation information; and
    performing, at the first computing device, a security action comprising:
        identifying holiday information associated with the geolocation of the first computing device;
        determining at least a portion of a current day is a holiday by comparing a current date to the holiday information;
        determining a level of parental controls to impose on operation of the first computing device in response to at least a portion of the current day being a holiday, wherein the level of parental controls to impose on the first computing device is different than a level of parental controls imposed on non-holidays; and
        imposing the level of parental controls to impose on the first computing device during the at least a portion of the current day.

2. The method of claim 1, further comprising associating information identifying the holiday with information identifying the level of parental controls to impose on the holiday.

3. The method of claim 2, further comprising storing, in a user profile, the information identifying the holiday with the information identifying the level of parental controls to impose on the holiday.

4. The method of claim 1, wherein the geolocation information comprises at least one of:
    global positioning information;
    a regional code;
    a state code;
    a country code; and
    a postal code.

5. The method of claim 1, wherein the security action further comprises:
    calling an API to request the holiday information; and
    receiving the holiday information in response to requesting the API.

6. The method of claim 1, wherein the security action further comprises:
    querying a website for the holiday information;
    receiving hypertext markup language (HTML) information from the website in response to the query; and
    extracting the holiday information from the received HTML information.

7. The method of claim 6, wherein the website is a school website.

8. The method of claim 1, wherein the at least a portion of the current day is at least one of a school holiday, a national holiday, and a regional holiday.

9. The method of claim 1, wherein the level of parental controls to impose enables a level of at least one of:
    access to the first computing device for a predetermined duration;
    access to a program the first computing device is configured to execute; and
    internet access by the first computing device.

10. The method of claim 1, wherein the level of parental controls to impose disables a level of at least one of:
   access to the first computing device for a set duration;
   access to a program the first computing device is configured to execute; and
   internet access by the first computing device.

11. The method of claim 1, wherein the security action further comprises displaying, on a user display device of the first computing device, a message indicating the imposing of the level of parental controls on the first computing device.

12. The method of claim 1, wherein the security action further comprises sending, to a second computing device, a message indicating the imposing of the level of parental controls on the first computing device during at least a portion of the current day.

13. The method of claim 1, wherein the security action further comprises changing, following an end of the holiday, the level of parental controls to the level of parental controls imposed on non-holidays.

14. A system for automatically adjusting parental controls of computing devices to accommodate holidays, the system comprising:
   at least one physical processor of a first computing device; and
   physical memory comprising computer-executable instructions that, when executed by the physical processor, cause the physical processor to:
      identify a geolocation of the first computing device from geolocation information; and
      perform a security action comprising:
         identifying holiday information associated with the geolocation of the first computing device;
         determining at least a portion of a current day is a holiday by comparing a current date to the holiday information;
         determining a level of parental controls to impose on operation of the first computing device in response to at least a portion of the current day being a holiday, wherein the level of parental controls to impose on the first computing device is different than a level of parental controls imposed on non-holidays; and
         imposing the level of parental controls to impose on the first computing device during the at least a portion of the current day.

15. The system of claim 14, wherein the security action further comprises:
   calling an API to request the holiday information; and
   receiving the holiday information in response to requesting the API.

16. The system of claim 14, wherein the security action further comprises:
   querying a website for the holiday information;
   receiving hypertext markup language (HTML) information from the website in response to the query; and
   extracting the holiday information from the received HTML information.

17. The system of claim 14, wherein the security action further comprises sending, to a second computing device, a message indicating the imposing of the level of parental controls on the first computing device during at least a portion of the current day.

18. A non-transitory computer-readable medium comprising one or more computer-executable instructions that, when executed by at least one processor of a computing device, cause the computing device to:
   identify a geolocation of the computing device from geolocation information; and
   perform a security action comprising:
      identifying holiday information associated with the geolocation of the computing device;
      determining at least a portion of a current day is a holiday by comparing a current date to the holiday information;
      determining a level of parental controls to impose on operation of the computing device in response to at least a portion of the current day being a holiday, wherein the level of parental controls to impose on the computing device is different than a level of parental controls imposed on non-holidays; and
      imposing the level of parental controls to impose on the computing device during the at least a portion of the current day.

19. The non-transitory computer-readable medium of claim 18, wherein the security action further comprises:
   calling an API to request the holiday information; and
   receiving the holiday information in response to requesting the API.

20. The non-transitory computer-readable medium of claim 18, wherein the security action further comprises:
   querying a website for the holiday information;
   receiving hypertext markup language (HTML) information from the website in response to the query; and
   extracting the holiday information from the received HTML information.

* * * * *